Feb. 16, 1971      C. C. RENFROE      3,563,015
ROTARY LAWNMOVER CUTTER BAR
Filed May 21, 1968
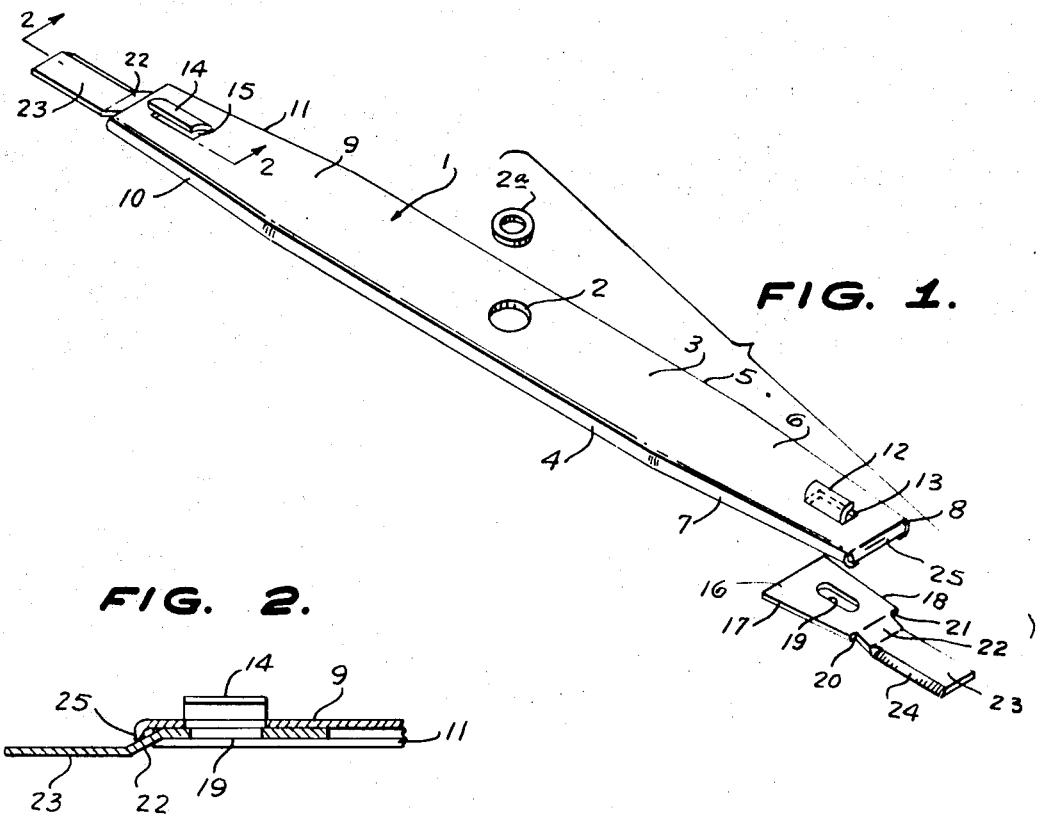
INVENTOR.
CHARLIE C. RENFROE,
BY
*Linton and Linton*
ATTORNEYS.

United States Patent Office 3,563,015
Patented Feb. 16, 1971

3,563,015
ROTARY LAWNMOWER CUTTER BAR
Charlie C. Renfroe, Montgomery, Ala.
(P.O. Box 250, Broxton, Ga. 31519)
Filed May 21, 1968, Ser. No. 730,888
Int. Cl. A01d 55/18
U.S. Cl. 56—295        2 Claims

ABSTRACT OF THE DISCLOSURE

A cutter bar for power driven rotary blade-type mowers having detachable cutter blades which are slideably mounted in spaced apart channels on the ends of the cutter bar and includes stops extending laterally of the cutter bar and cutter blades to prevent the longitudinal movement of the cutter blades outwardly of the cutter bar.

---

The present invention relates to the lawnmowers with rotary cuters and is more particularly directed to a cutter bar for mowers of that type.

The principle objects of the present invention is to provide a cutter bar for new and used power driven rotary type mowers for being rotated thereby in a substantially horizontal position over the ground and which cutter bar has cutter blades which are quickly and easily mountable on and demountable from said cutter bar without requiring special knowledge or tools.

Another important object of the invention is to provide cutter bars for rotary type lawnmowers which cutter bars can be quickly and readily produced at low cost and have cutter blades slideable and detachable mounted at each end of each cutter bar which cutter blades are retained on their cutter bar by centrifugal force when their cutter bar is being rotated by a mower as when cutting vegetation.

Further objects of the invention will be in part pointed out and in part obvious from the following description of the accompanying drawing, in which:

FIG. 1 is a partially exploded perspective view of the present invention.

FIG. 2 is an enlarged sectional view taken on line 2—2 of FIG. 1.

FIG. 3 is an enlarged inverted perspective view of the left end portion of the cutter bar of FIG. 1.

Referring now more particularly to the accompanying drawing in which like and corresponding parts are designated by similar reference characters, numeral 1 generally indicates a longitudinally elongated cutter bar, which has a flat base 3 with a center opening 2 for receiving therethrough and connecting therewith a conventional manner the cutter bar drive shaft of a rotary mower (not shown). Center opening 2 is of a sufficient diameter to accomodate large mower shafts, or grommets or washers on said larger shafts or smaller shafts, which have the same outside diameter as the inside diameter of said opening 2. That is, large mower shafts can be mounted through center opening 2 as can grommets or washers 2a on smaller mower shafts in order to accommodate different size mower shafts as used on different mowers. Thus, by using different size grommets or washers 2a and different length cutter blades to provide a universal cutting blade making it possible for a user or seller to mount the present cutter blade on anyone of a majority of lawnmowers as presently known while carrying a minimum of parts therefor.

Said base 3 has curved side legs 4 and 5 providing a channel shaped cutter bar and an end portion 6 with inwardly slanting sides so that said legs extend inwardly at 7 and 8 towards their end of said cutter bar. The opposite end portion 9 of said base 3 also has inwardly slanting sides so that said legs extend inwardly at 10 and 11 towards their end of said cutter.

Cutter bar end portion 6 has a stamped out curved blade 12 leaving opening 13 while end portion 9 has a similar, but oppositely directed stamped out curved blade 14 leaving opening 15. Said blades 12 and 14 extend in an opposite direction to side legs 4 and 5 respectively.

A pair of cutter blades are used with cutter bar 1 and each have a flat base 16 with sides 17 and 18 extending on an inward slant towards shoulders 20 and 21 respectively and a longitudinal slot 19. A medial portion 22 extends on an obtuse angle from base 16 to a cutter end portion 23 and is narrower than base 16 forming said shoulders therewith. Said cutter end portion has a sharpened cutting edge 24.

A pair of stops 25 are each integral with each end portion 6 or 9 and extend between the ends of leg portion 7 and 8 or 10 and 11. The stop 25 at each end of cutter bar 1 is the same and as a result only one stop is shown in FIG. 3, where the stop 25 extends from base portion 9 partially of the height of leg portions 10 and 11 leaving grooves 26 and 27 provided by the inner sides of leg portions 11 and 12 partially extending beyond said stop. Stops 25 can each be a separate piece welded to base portion 6 or 9 and leg end portions 7 and 8 or 10 and 11 respectively, or extensions of base 3 bent normal thereto and then welded to said leg end portions. Stops 25 being connected to the ends of legs 7 and 8 and 10 and 11 prevent said legs from spreading apart under operating conditions and thus assures that the cutter blade bases 16 can not be thrown outwardly from the cutter bar 1.

In the use of the cutter bar 1, the drive shaft of a rotary lawnmower is extended therethrough and connected to said cutter bar in any conventional manner for rotating said cutter bar horizontally to the ground for cutting vegetation and the like therebeneath. The present cutter blade 1 as shown in the drawings must turn in a clockwise direction looking downwardly on FIG. 1 so that the cutting edges 24 will cut the grass for example. Since the blades 12 and 14 extend in an opposite direction to their respective cutting edges 24 said blades will scoop up air causing reduced pressure below the cutter bar 1 since holes 19 in the cutter blade bases 16 and 13 and 15 of said cutter bar coincide and this low pressure area below blades 3 and 14 creates a partial vacuum beneath said cutter bar which would have a tendency to lift the grass therebeneath to a better cutting position and at the same time would creates a high pressure area above cutter bar 1 which would serve as a fan to blow the cut grass away from the mower. However, it is to be appreciated that cutter bar 1 could equally as well be rotated counter clockwise with the cutting edges 24 on the opposite side of end portions 23 to that shown in the drawing and with the blades 12 and 14 extending in an opposite direction to said base 3 from that shown in the drawing.

Cutter blade base 16 is placed on base 3 between legs 4 and 5 and slid longitudinally therealong until cutter blade medial portion 22 is retained by stop 25 at one end of said cutter bar while a second cutter blade is similarly positioned against the second stop 25. Sides 17 and 18 of each cutter blade slides in grooves 26 and 27 and said sides are of a configuration to mate with leg end portions 7 and 8 or 10 and 11 when medial portion 22 reaches stops 25 assisting in retaining said cutter blades from further longitudinal movement. Slot 19 will then coincide with an opening 13 or 15 and cutting edges 24 will extend longitudinally and from said cutter bar 1. Reversal of the longitudinal sliding of said cutting blades will permit their removal for replacement, sharpening or the like and said cutting blades are interchangeable at either end of the cutting bar 1.

I claim:
1. A cutter bar for rotating blade-type mowers having a drive shaft comprising an elongated bar capable of attachment to the mower drive shaft for rotation therewith having curved laterally extending legs providing a channel therebetween and tapered end portions with said legs extending on a slant lengthwise of said bar towards one another to the ends of said bar, a pair of stops each extending between said legs at an end of said bar partially of the height of said legs, a plurality of cutter blades each having a base portion, a cutting portion and a medial portion extending on an angle to and from said base portion to said cutting portion, said cutting blade base portions each having sides slanting inwardly towards said medial portion and spaced apart to slideably extend between said legs up to said stops with said medial portions also engaging and being retained by said stops.

2. A cutter bar for rotary blade-type mowers having a drive shaft as claimed in claim 1 wherein said bar tapered end portions each having an opening and a curved blade alongside said opening and each of said cutter blades has an opening positioned to coincide with one of said bar openings when its cutter blade is mounted on said cutter bar against one of said stops.

References Cited

UNITED STATES PATENTS

| | | | |
|---|---|---|---|
| 2,859,581 | 11/1958 | Kroll et al. | 56—295 |
| 2,924,059 | 2/1960 | Beeston, Jr. | 56—295 |
| 3,032,957 | 5/1962 | Boyer | 56—295X |
| 3,321,894 | 5/1967 | Ingram | 56—295 |
| 3,388,540 | 6/1968 | Michaud | 56—295 |
| 2,318,430 | 5/1943 | Spahn | 56—295X |
| 2,651,159 | 9/1953 | Rountree, Sr. | 56—295X |
| 2,706,441 | 4/1955 | Caldwell et al. | 56—295UX |

FOREIGN PATENTS

| | | | |
|---|---|---|---|
| 262,850 | 8/1960 | Australia | 56—295 |
| 249,011 | 1/1964 | Australia | 56—295 |
| 266,830 | 4/1966 | Australia | 56—295 |
| 265,864 | 3/1966 | Australia | 56—295 |

LOUIS G. MANCENE, Primary Examiner

J. A. OLIFF, Assistant Examiner